United States Patent
Liu et al.

(10) Patent No.: US 9,436,189 B2
(45) Date of Patent: Sep. 6, 2016

(54) THERMOREGULATOR

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Jing Liu, Guangdong (CN); Xudong Song, Guangdong (CN); Hongjun Wang, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 329 days.

(21) Appl. No.: 14/254,815

(22) Filed: Apr. 16, 2014

(65) Prior Publication Data
US 2014/0224892 A1   Aug. 14, 2014

Related U.S. Application Data

(63) Continuation of application No. PCT/CN2012/081152, filed on Sep. 7, 2012.

(30) Foreign Application Priority Data

Oct. 27, 2011 (CN) .......................... 2011 1 0331307

(51) Int. Cl.
G05D 23/02     (2006.01)
G05D 23/185    (2006.01)
F01P 7/16      (2006.01)

(52) U.S. Cl.
CPC ............. *G05D 23/1852* (2013.01); *F01P 7/16* (2013.01); *G05D 23/022* (2013.01)

(58) Field of Classification Search
CPC .. G05D 23/02; G05D 23/021; G05D 23/022; G05D 23/1852; F01P 7/16
USPC .............................................. 236/93 R, 93 A
See application file for complete search history.

(56) References Cited

U.S. PATENT DOCUMENTS 4,679,530 A   7/1987  Kuze
5,813,598 A   9/1998  Kim
(Continued)

FOREIGN PATENT DOCUMENTS

CN   101133235 A    2/2008
EP   1715156 A2    10/2006
(Continued)

OTHER PUBLICATIONS

PCT International Search Report mailed Dec. 13, 2012, issued in International Application No. PCT/CN2012/081152 (5 pages).

*Primary Examiner* — Marc Norman
(74) *Attorney, Agent, or Firm* — Finnegan, Henderson, Farabow, Garrett & Dunner, LLP

(57) ABSTRACT

An apparatus for regulating temperature is presented. The apparatus comprises: a shell comprising a first cavity and a second cavity; and an inner valve body and an outer valve body disposed in the shell between the first cavity and the second cavity, wherein the inner valve body is movable relative to the outer valve body, and the outer valve body is movable within the shell. Depending on the temperature inside the shell, the inner valve body and the outer valve body can substantially seal the first cavity from the second cavity. The inner valve body and the outer valve body can also provide, respectively, a first flow path and a second flow path between the cavities, depending on the temperature.

20 Claims, 3 Drawing Sheets

(56) References Cited

U.S. PATENT DOCUMENTS 7,886,987 B2 * 2/2011 Guterman ............... E03C 1/041
            236/100
8,047,450 B2 * 11/2011 Hutchins ................. F01P 7/16
            123/41.05

FOREIGN PATENT DOCUMENTS

| EP | 1715156 A3 | 12/2007 |
| JP | H 10-176531 A | 6/1998 |
| KR | 10-2009-0065302 A | 6/2009 |
| WO | WO 2013/060202 A1 | 5/2013 |

* cited by examiner

THERMOREGULATOR

CROSS-REFERENCE TO RELATED APPLICATIONS

This application is a continuation of International Application No. PCT/CN2012/081152, filed on Sep. 7, 2012, which claims priority to and benefits of Chinese Patent Application No. 201110331307.6, filed with the State Intellectual Property Office of China on Oct. 27, 2011. The entire contents of the above-referenced applications are incorporated herein by reference.

FIELD

The present disclosure relates generally to a thermoregulator, and more particularly, to a variable flow-rate thermoregulator.

BACKGROUND ART

Thermoregulator is generally used in the cooling system of an engine. The thermoregulator can be opened or closed automatically according to the temperature of a cooling liquid to change the flowing path of the cooling liquid, and thus to regulate the temperature of the engine.

The working principle of the conventional thermoregulator is taking advantage of the characteristic of expanding with heat and contracting with cold, of some materials, such as paraffin. When the temperature of cooling liquid is low, the thermoregulator is closed. The thermoregulator will be opened due to the expanding of paraffin with heat when the temperature of cooling liquid reaches a predetermined temperature. However, when the thermoregulator is opened, the variation of liquid flow rate cannot be precisely controlled.

Thus, there is a need for a thermoregulator which allows precise control of variation of liquid flow rate, and hence rate of energy transfer, even when the temperature is high enough for the thermoregulator to open.

SUMMARY

Embodiments of the present disclosure seek to solve at least one of the problems existing in the prior art to at least some extent, or to provide a consumer with a useful commercial choice.

An embodiment of the present disclosure provides a thermoregulator, comprising: a shell having an inner cavity therein; a pushrod disposed in the shell; a heat-sensitive element disposed in the shell and adapted to push the pushrod to move by expanding with heat, inner and outer valve bodies disposed in the shell; a sealing member mounted on the outer valve body and having an inner ring surface and an outer ring surface, and an elastic member disposed between the shell and the inner valve body, wherein the sealing member and the outer valve body encircle the inner valve body, wherein the sealing member and the inner valve body divide the inner cavity of the shell into a first cavity and a second cavity, and the elastic member normally pushes the inner valve body in a first direction from the first cavity toward the second cavity, wherein the inner ring surface of the sealing member is adapted to contact with the inner valve body, and the outer ring surface of the sealing member is adapted to contact with the shell such that the liquid is prevented from flowing between the first cavity and the second cavity, wherein when a temperature of the liquid in the second cavity is higher than a first predetermined temperature and lower than a second predetermined temperature, the heat-sensitive element is expanded to push the pushrod and thus the inner valve body to move in a second direction opposed to the first direction such that the inner ring surface is separated from the inner valve body and the outer ring surface of the sealing member is contacted with the shell; and wherein when the temperature of the liquid in the second cavity is equal to or higher than the second predetermined temperature, the inner valve body is contacted with the outer valve body to move the outer valve body in the second direction such that the outer ring surface is separated from the shell.

With the thermoregulator according to the embodiment of the present disclosure, the first cavity and the second cavity may be communicated via two flowing paths: a first flowing path is formed by a gap between the inner ring surface and the inner valve body, a second flowing path is formed by a gap between the outer ring surface and the shell.

When the temperature of the liquid in second cavity is lower than the first predetermined temperature, both the first and second flowing paths are closed. When the temperature of the liquid in second cavity is higher than the first predetermined temperature and lower than the second predetermined temperature, the inner valve body moves towards the first cavity, the first flowing path between the inner ring surface and the inner valve body is opened; the liquid may flow between the first cavity and the second cavity in a certain flow rate. While the temperature of the liquid increases, the inner valve body keeps moving towards the first cavity. When the temperature of the liquid is equal to or higher than the second predetermined temperature, the inner valve body pushes the outer valve body to move towards the first cavity. The second flowing path between the outer ring surface and the shell is opened. The flow rate will be increased because two flowing paths are opened. Thus the liquid flow rate may be controlled precisely by controlling the two flowing paths.

Additional aspects and advantages of embodiments of present disclosure will be given in part in the following descriptions, become apparent in part from the following descriptions, or be learned from the practice of the embodiments of the present disclosure.

DETAILED DESCRIPTION

Figure 1:
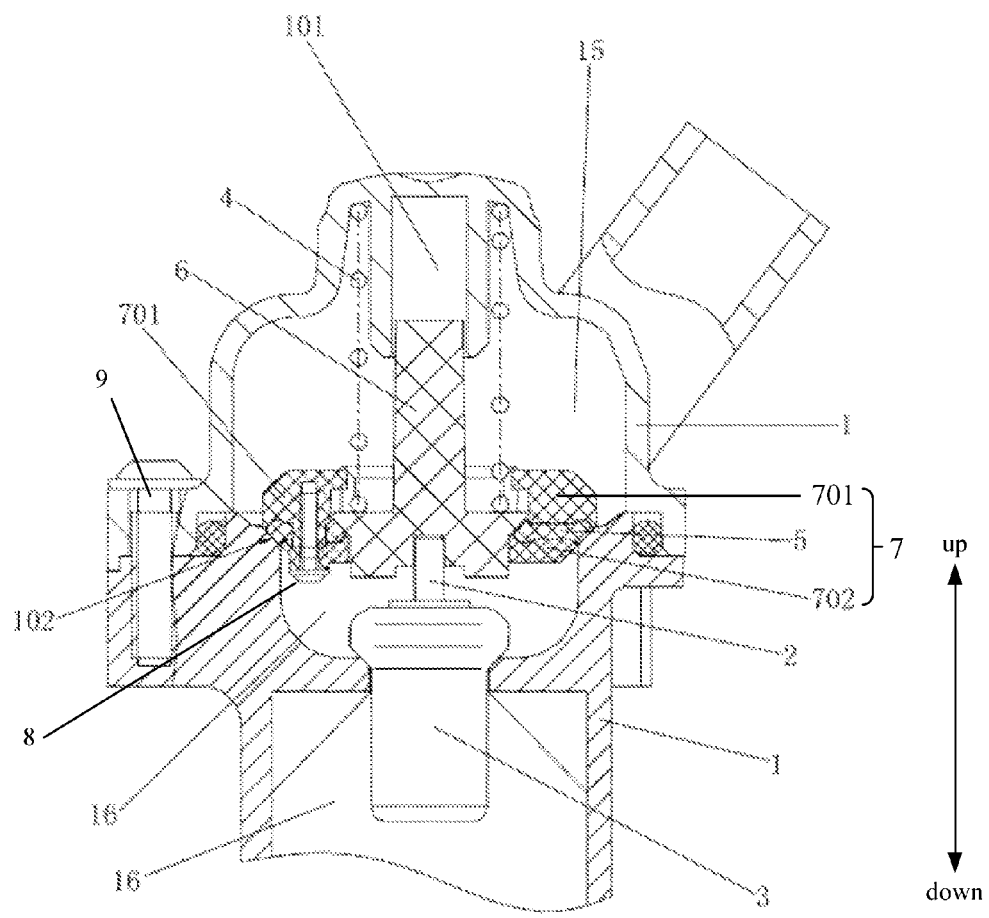
FIG. 1 is a cross-sectional view of a thermoregulator according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A thermoregulator according to an embodiment of the present disclosure, comprises: a shell having an inner cavity therein; a pushrod disposed in the shell; a heat-sensitive element disposed in the shell and adapted to push the pushrod to move by expanding with heat, inner and outer valve bodies disposed in the shell; a sealing member mounted on the outer valve body and having an inner ring surface and an outer ring surface, and an elastic member disposed between the shell and the inner valve body, wherein the sealing member and the outer valve body encircle the inner valve body, wherein the sealing member and the inner valve body divide the inner cavity of the shell into a first cavity and a second cavity, and the elastic member normally pushes the inner valve body in a first direction from the first cavity toward the second cavity, wherein the inner ring surface of the sealing member is adapted to contact with the inner valve body, and the outer ring surface of the sealing member is adapted to contact with the shell such that the liquid is prevented from flowing between the first cavity and the second cavity, wherein when a temperature of the liquid in the second cavity is higher than a first predetermined temperature and lower than a second predetermined temperature, the heat-sensitive element is expanded to push the pushrod and thus the inner valve body to move in a second direction opposed to the first direction such that the inner ring surface is separated from the inner valve body and the outer ring surface of the sealing member is contacted with the shell; and wherein when the temperature of the liquid in the second cavity is equal to or higher than the second predetermined temperature, the inner valve body is contacted with the outer valve body to move the outer valve body in the second direction such that the outer ring surface is separated from the shell.

With the thermoregulator according to the embodiment of the present disclosure, the first cavity and the second cavity may be communicated via two flowing paths: a first flowing path is formed by a gap between the inner ring surface and the inner valve body, a second flowing path is formed by a gap between the outer ring surface and the shell.

When the temperature of the liquid in second cavity is lower than the first predetermined temperature, both the first and second flowing paths are closed. When the temperature of the liquid in second cavity is higher than the first predetermined temperature and lower than the second predetermined temperature, the inner valve body moves towards the first cavity, the first flowing path between the inner ring surface and the inner valve body is opened; the liquid may flow between the first cavity and the second cavity in a certain flow rate. While the temperature of the liquid increases, the inner valve body keeps moving towards the first cavity. When the temperature of the liquid is equal to or higher than the second predetermined temperature, the inner valve body pushes the outer valve body to move towards the first cavity. The second flowing path between the outer ring surface and the shell is opened. The flow rate will be increased because two flowing paths are opened. Thus the liquid flow rate may be controlled precisely by controlling the two flowing paths.

Advantageously, the elastic member is disposed in the first cavity, the heat-sensitive element is disposed in the second cavity, the elastic member, the inner valve body, the pushrod and the heat-sensitive element are arranged in turn along the first direction.

The outer valve body comprises an upper ring element and a lower ring element, the sealing member is sandwiched in between the upper ring element and the lower ring element, and the sealing member, the upper ring element and the lower ring element are fixed one another.

In some embodiments, the inner valve body comprises a substrate plate, a first guide part formed on a lower side of the substrate plate, and a second guide part formed on an upper side of the substrate plate, the lower ring element has a first center hole, the first guide part is disposed in the first center hole via a clearance fit, and the shell has a second guide hole, and the second guide part is disposed in the second guide hole via a clearance fit.

Moreover, the upper ring element comprises at least one suspension part extended above the substrate plate, and when the temperature of the liquid in the second cavity is equal to or higher than the second predetermined temperature, the inner valve body is caught by the at least one suspension part to move the outer valve body in the second direction.

Advantageously, the inner valve body further comprises a third guide part disposed on the upper side of the substrate plate, the third guide part comprises a plurality of arc plate parts extended from an outer periphery of the substrate plate in an axial direction of the substrate plate and distributed on the substrate plate along a circumferential direction of the substrate plate, the second guide part is disposed at a center of a circle at which the plurality of arc plate parts are disposed, the upper ring element has a second center hole and a plurality of first projection parts, the first projection parts are distributed on the upper ring element along a circumferential direction of the second center hole, each first projection part comprises one suspension part, each suspension part is extended above the second center hole, and a guide gap is formed between two adjacent first projection parts, the second guide part and the plurality of arc plate parts pass through the second center hole and are moveable along an axial direction of the second center hole, each arc plate part is disposed in a corresponding one of the guide gaps via clearance fit.

In a further embodiment, the substrate plate comprise a first conical surface located obliquely above the inner ring surface and adapted to contact with the inner ring surface, and the shell has a second conical surface located obliquely under the outer ring surface and adapted to contact with the outer ring surface.

Advantageously, the first guide part comprises a center cylindrical part and a plurality of guide plate parts surrounding the center cylindrical part.

Advantageously, the elastic member is a compression spring.

The thermoregulator according to embodiments of the present disclosure will be described in detail with reference to FIGS. 1-4 below.

As shown in FIG. 1, a thermoregulator comprises: a shell 1 having an inner cavity therein; a pushrod 2 disposed in the shell 1; a heat-sensitive element 3 disposed in the shell 1 and adapted to push the pushrod 2 to move by expanding with heat; an inner valve body 6, and an outer valve body 7 disposed in the shell 1; a sealing member 5 such as a sealing ring mounted on the outer valve body 7 and having an inner ring surface and an outer ring surface, and an elastic member 4, such as a compression spring, disposed between the shell 1 and the inner valve body 6. In some embodiments, the inner cavity contains a liquid.

The sealing member 5 and the outer valve body 7 encircle the inner valve body 6. The sealing member 5 and the inner valve body 6 divide the inner cavity of the shell 1 into a first cavity 15 and a second cavity 16, and the elastic member 4 can push the inner valve body 6 in a first direction (e.g. the downward direction in FIG. 1) away from the first cavity 15 toward the second cavity 16.

The inner ring surface of the sealing member 5 is adapted to contact with the inner valve body 6, and the outer ring surface of the sealing member 5 is adapted to contact with the shell 1, such that the first cavity 15 and the second cavity 16 can be sealed off from each other, and the liquid in the inner cavity can be prevented from flowing between the first cavity 15 and the second cavity 16.

When a temperature of the liquid in the second cavity 16 is higher than a first predetermined temperature and lower than a second predetermined temperature, the heat-sensitive element 3 can expand to push the pushrod 2, which can then push the inner valve body 6 to move in a second direction (e.g. the upward direction in FIG. 1) such that the inner ring surface of the sealing member 5 is separated from the inner valve body 6 while the outer ring surface of the sealing member 5 remains in contact with the shell 1.

When the temperature of the liquid in the second cavity 16 continues to rise such that, for example, the temperature of the liquid in the second cavity 16 is equal to or higher than the second predetermined temperature, the inner valve body 6 may continue to move in the second direction. The inner valve body 6 may then push the outer valve body 7 in the second direction, such that the outer ring surface of the sealing member 5 is separated from the shell 1. In some embodiments, a driven part is formed on the outer valve body 7, and the inner valve body 6 can catch the driven part while moving in the second direction so as to drive the outer valve body to move in the second direction.

When the inner ring surface of the sealing member 5 is separated from the inner valve body 6 while the outer ring surface of the sealing member 5 is in contact with the inner surface of the shell 1, a first flow path can be formed between the inner ring surface and inner valve body 6, and the first cavity 15 and the second cavity 16 can join together via the first flowing path between the inner valve body 6 and the inner ring surface.

When the outer ring surface of the sealing member 5 is separated from shell 1, a second flowing path can be formed between outer ring surface and shell 1, and the first cavity 15 and the second cavity 16 can join together via the first and second flowing paths.

Figure 3:
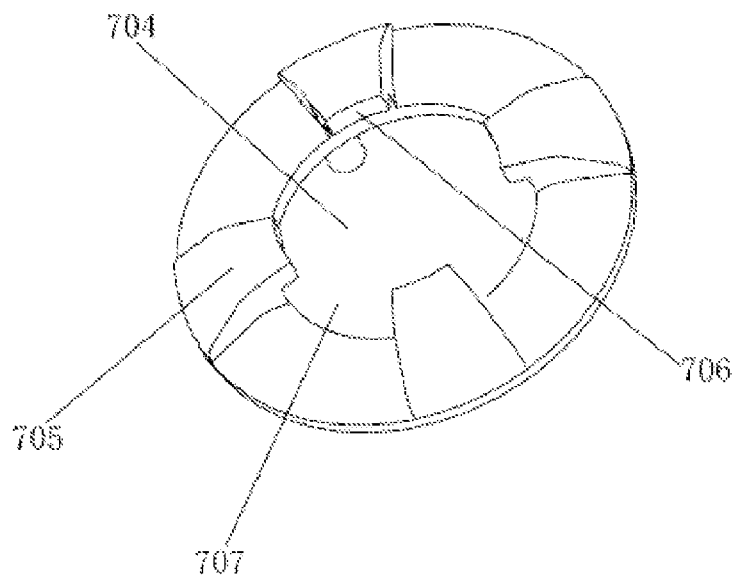
FIG. 3 is a perspective view of an upper ring element of a thermoregulator according to an embodiment of the present disclosure.

The driven part of the outer valve body may be made in various ways. For example, one or more blocking part is formed on the outer valve body in the moving path along which the inner valve body 6 moves towards the first cavity 15. When the inner valve body 6 moves to a certain position, the inner valve body 6 can be caught by the blocking part, and then the inner valve body 6 can push the outer valve body to move in the second direction. In some embodiments, as shown in FIG. 3, the driven part may be formed by forming a suspension part 706 on the outer valve body which will be described below.

Figure 2:
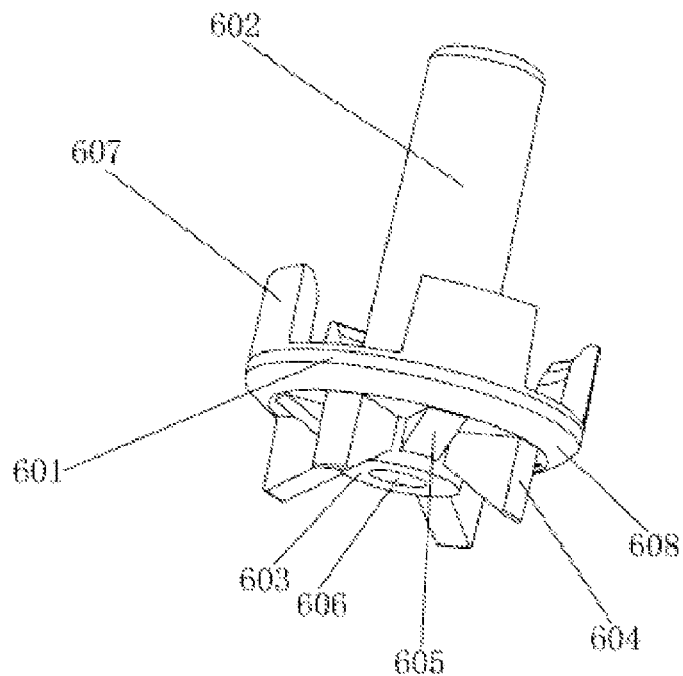
FIG. 2 is a perspective view of an inner valve body of a thermoregulator according to an embodiment of the present disclosure.

As shown in FIG. 2, the inner valve body 6 comprises a substrate plate 601 which can be a circular plate; a first guide part formed on a lower side of substrate plate 601, a second guide part 602 formed on an upper side of the substrate plate 601, and a third guide part disposed on the upper side of substrate plate 601.

The first guide part comprises a center cylindrical part 603, four guide plate parts 604 surrounding the center cylindrical part 603, and four strengthen reinforcing plates 605 surrounding the center cylindrical part 603.

The four strengthen reinforcing plates 605 and the four guide plates 604 are alternately arranged along the peripheral direction of the center cylindrical part 603. Each guide plate part 604 is connected with the substrate plate 601 and with the center cylindrical part 603. Each strengthen reinforcing plate 605 is also connected with the substrate plate 601 and with the center cylindrical part 603. The reinforcing plates 605 can reinforce the connection between the substrate plate 601 and the center cylindrical part 603, thus improving the strength of the inner valve body 6.

The center cylindrical part 603 comprises a third center hole 606 adapted to the pushrod 2. The second guide part 602 has a cylinder shape. The third guide part comprises four arc plate parts 607 extended from an outer periphery of the substrate plate 601 in an axial direction of substrate plate 601 and distributed on the substrate plate 601 along a circumferential direction of the substrate plate 601. The four arc plate parts 607 are disposed around the second guide part 602.

The outer valve body 7 comprises an upper ring element 701 and a lower ring element 702. The sealing member 5 is sandwiched in between the upper ring element 701 and the lower ring element 702. The sealing member 5, the upper ring element 701 and the lower ring element 702 may be fixed one another by screws.

In some embodiments, the upper ring element 701 comprises one or more first cylindrical parts extended to the lower ring element 702. The cylindrical parts are disposed on the upper ring element 701 along a circumferential direction of upper ring element 701. Each first cylindrical part has a screwed hole. The sealing member 5 has mounting holes corresponding to each first cylindrical parts respectively. The lower ring element 702 has second mounting holes corresponding to the screwed holes of the first cylindrical parts. Each first cylindrical part passes through a corresponding first mounting hole. Each screw 8, as shown in FIG. 1, passes through the corresponding second mounting hole and the screwed hole. In some embodiments, the upper ring element 701, the sealing member 5 and the lower ring element 702 may be fixed to one another via other ways. It is convenient to fix sealing member 5 by dividing the outer valve body into the upper ring element 701 and the lower ring element 702 and sandwiching sealing member 5 between the ring elements.

Figure 4:
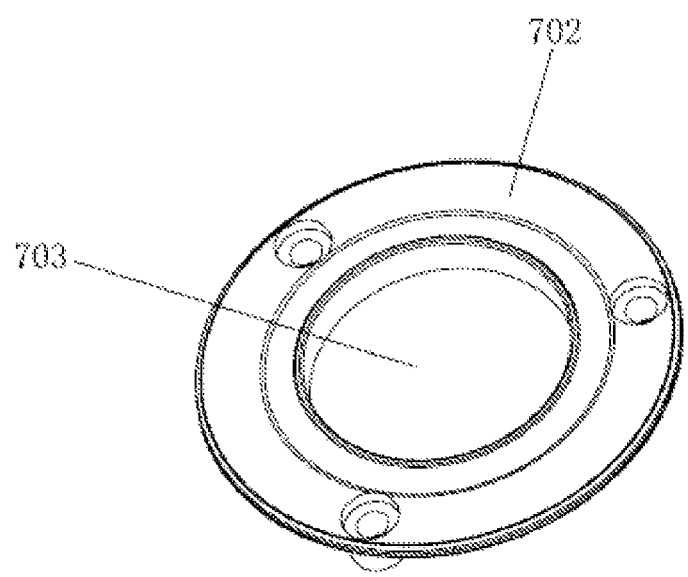
FIG. 4 is a perspective view of a lower ring element of a thermoregulator according to an embodiment of the present disclosure.

As shown in FIG. 4, the lower ring element 702 comprises a first center hole 703. The first guide part of the inner valve body 6, as shown in FIG. 2, can be disposed in first center hole 703 via clearance fit. The first guide part may then move back and forth along an axial direction of first center hole 703. The first center hole 703 guides the first guide part. The first guide part provides an interspace for liquid flowing. Specifically, the center cylindrical part 603, the guide plate 604 and the strengthen reinforcing plate 605 are disposed in first center hole 703, the guide plate 604 is disposed in the first center hole 703 via clearance fit. The gaps between adjacent guide plates 604 form the interspaces.

As shown in FIG. 3, the upper ring element 701 has a second center hole 704 and four first projection parts 705. The four first projection parts 705 are distributed on upper ring element 701 along a circumferential direction of second center hole 704. Each first projection part 705 comprises one suspension part 706. The four suspension parts 706 are extended above part of the second center hole 704. The space between two adjacent first projection parts 705 forms a guide gap 707.

In some embodiments, the outer diameter of substrate plate 601 is smaller than the diameter of the second center hole 704. The second guide part 602 and the four arc plate parts 607 can pass through the second center hole 704 and are moveable along the axial direction of the second center hole 704. The four arc plate parts 607 are disposed corresponding to each of the guide gaps 707 via clearance fit. When the inner valve body 6 moves relative to the outer valve body 7, the guide gaps 707 guide the arc plate parts 607.

Referring back to FIG. 1, the shell 1 further comprises a second guide hole 101 adapted to the second guide part 602. A part of the second guide part 602 is disposed in the second guide hole 101 via clearance fit. The second guide part 602 may move relatively to the second guide hole 101.

Referring back to FIG. 2, the substrate plate 601 further comprises a first inclined surface 608 adapted to contact with the inner ring surface of the sealing member 5 to seal the joint between the first inclined surface 608 and the inner ring surface. Moreover, the sealing member 5 can be prevented from moving in the second direction (e.g. upwardly in FIG. 1), by the first inclined surface 608. Therefore, the outer valve body 7 can also be prevented from moving upwardly. Referring back to FIG. 1, the shell 1 also has a second inclined surface 102 which is inclined relatively to the movement direction of the inner valve body 6. The second inclined surface 102 is located under the outer ring surface of the sealing member 5 and can be in contact with the outer ring surface to prevent the outer valve body 7 from moving in the first direction (e.g. downwardly in FIG. 1).

Referring to FIGS. 1 and 2, the pushrod 2, the heat-sensitive element 3, the elastic member 4, the sealing member 5, the inner valve body 6 and the outer valve body are disposed in shell 1. The sealing member 5 and the inner valve body 6 divide the inner cavity of shell 1 into the first cavity 15 and the second cavity 16. The pushrod 2 and the heat-sensitive element 3 are disposed in second cavity 16. The lower end of pushrod 2 is disposed in the heat-sensitive element 3, and the upper end of the pushrod 2 is disposed in the third center hole 606. When the heat-sensitive element 3 is expanded when being heated, the heat-sensitive element 3 exerts a force towards the second direction (e.g. upwardly in FIG. 1) onto the pushrod 2, then the pushrod 2 exerts a force towards the second direction onto the inner valve body 6. The second guide part 602 extends to the first cavity 15. The elastic member 4 is disposed in the first cavity 15. The upper end of the elastic member 4 can exert force onto shell 1, and the lower end of the elastic member 4 can exert a force onto the substrate plate 601, as well as the inner valve body 6, towards a first direction (e.g. downwardly in FIG. 1).

The first cavity 15 and second cavity 16 may have openings connected to other components to circulate the liquid. The method of providing the opens and the locations of the openings are well known, and the detailed description thereof is omitted here.

The shell 1 may be formed integrally. In order to assemble the elements easily, the shell 1 may comprise an upper shell and a lower shell. Specifically, the upper shell and the lower shell are connected via screws 9. A sealing ring is disposed between the upper shell and the lower shell. The lower shell may be a separate member or a part of other components, such as a part of the engine when the thermoregulator according to embodiments of the present disclosure is used in an engine cooling system.

The working principle of the thermoregulator according to embodiments of the present disclosure will be described below.

When the temperature of the liquid in second cavity 16 is low, the expanding of heat-sensitive element 3 is small. When the pushing force that heat-sensitive element 3 exerts onto pushrod 2, as well as the pushing force that pushrod 2 exerts onto the inner valve body 6, are smaller than the pressing force of the elastic member 4 onto the inner valve body 6, the inner valve body 6 may stay in its lowest position. The outer valve body 7 may also stay in its lowest position due to the force exerted by inner valve body 6 via the first inclined surface 608. The outer ring surface of sealing member 5 is contacted with shell 1 and the first cavity 15 is sealed off from the second cavity 16.

When the temperature of the liquid in second cavity 16 is higher than a first predetermined temperature and lower than a second predetermined temperature, the expanding of heat-sensitive element 3 becomes greater. When the pushing force that the pushrod 2 exerts onto the inner valve body 6 becomes greater than the pressing force of elastic member 4 to the inner valve body 6, the inner valve body 6 may begin to move in the second direction (e.g. upwards). Thus the inner valve body 6 can move such that the inner ring surface is separated from the first inclined surface 608. The liquid may then flow between the first cavity 15 and the second cavity 16 through the first flowing path formed between the first inclined surface 608 and the inner ring surface of the sealing member 5.

As the temperature of the liquid in second cavity 16 continues to rise, the inner valve body 6 may move further along the second direction. When the temperature of the liquid in second cavity 16 is equal to or higher than the second predetermined temperature (the second predetermined temperature is higher than the first predetermined temperature), the substrate plate 601 can push against the suspension part 706 to move the upper ring element 701, as well as the lower ring element 702 and sealing member 5, along the second direction as well. As a result, the outer ring surface of sealing member 5 is separated from the shell 1. The liquid may flow between the first cavity 15 and the second cavity 16 through the space between the outer ring surface of sealing member 5 and the shell 1.

As described above, there are two flowing paths through which the liquid flows between the first cavity 15 and the second cavity 16. The first flowing path is formed by the space between the inner valve body 6 and the sealing member 5, the second flowing path is formed by the space between the sealing member 5 and the shell 1. When the temperature of the liquid is higher than the first predetermined temperature and lower than the second predetermined temperature, only the first flowing path is formed. The liquid may flow between the first cavity 15 and the second cavity 16 at a lower flow rate. When the temperature of liquid is equal to or higher than the second predetermined temperature, both flowing paths will be formed. The liquid can flow between the first cavity 15 and the second cavity 16 at a higher flow rate. Thus, the liquid flow rate may be controlled precisely by controlling the two flowing paths. And the controlling of the flow rate is achieved by mechanical structures, so that it is simple, reliable and low in cost.

The heat-sensitive element 3 may be made of paraffin. In some embodiments, it can also be made of other materials with good performance of expanding with heat and contracting with cold.

If the thermoregulator according to embodiments of the present disclosure is used in the engine cooling system, the first predetermined temperature may be about 81° C. to about 85° C., the second predetermined temperature may be about 93° C. to about 97° C. If the thermoregulator according to embodiments of the present disclosure is used in other technical fields, the first predetermined temperature and the second predetermined temperature may be any suitable value according to the actual situation.

In the specification, it is to be understood that an orientation or position relations referred by relative terms such as "central", "longitudinal", "lateral", "front", "rear", "right", "left", "inner", "outer", "lower", "upper", "horizontal", "vertical", "above", "below", "up", "top", "bottom", "clockwise" and "counterclockwise" as well as derivative thereof should be construed to refer to the orientation or position relations as then described or as shown in the drawings under discussion. These relative terms are for convenience of description and do not require that the present disclosure be constructed or operated in a particular orientation.

In embodiments of the present disclosure, the term "clearance fit" shall be broadly understood. It means not only the clearance fit between hole and shaft, but also clearance fit between two features or two components that allow relative movement there between.

In embodiments of the present disclosure, the sealing member 5 may seal the joint between the inner valve body 6 and the outer valve body, as well as the joint between the outside valve body and the shell 1. The structure of sealing is very simple, and it is very easy to mount the sealing member 5, so that the cost is reduced.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A thermoregulator, comprising:
a shell having an inner cavity therein;
a pushrod disposed in the shell;
a heat-sensitive element disposed in the shell and adapted to move the pushrod according to temperature,
inner and outer valve bodies disposed in the shell;
a sealing member mounted on the outer valve body and having an inner ring surface and an outer ring surface, and
an elastic member disposed between the shell and the inner valve body,
wherein the sealing member and the outer valve body encircle the inner valve body,
wherein the sealing member and the inner valve body divide the inner cavity of the shell into a first cavity and a second cavity, and the elastic member normally pushes the inner valve body in a first direction from the first cavity toward the second cavity,
wherein the inner ring surface of the sealing member is adapted to contact with the inner valve body, and the outer ring surface of the sealing member is adapted to contact with the shell such that a liquid in the inner cavity is prevented from flowing between the first cavity and the second cavity,
wherein when a temperature of the liquid in the second cavity is higher than a first predetermined temperature and is lower than a second predetermined temperature, the heat-sensitive element expands to push the pushrod and thus the inner valve body to move in a second direction opposed to the first direction such that the inner ring surface is separated from the inner valve body and the outer ring surface of the sealing member is in contact with the shell; and
wherein when the temperature of the liquid in the second cavity is equal to or higher than the second predetermined temperature, the inner valve body is in contact with the outer valve body to move the outer valve body in the second direction such that the outer ring surface is separated from the shell.

2. The thermoregulator as set forth in claim 1, wherein the elastic member is disposed in the first cavity, the heat-sensitive element is disposed in the second cavity, the elastic member, the inner valve body, the pushrod and the heat-sensitive element are arranged in turn along the first direction.

3. The thermoregulator as set forth in claim 1, wherein the outer valve body comprises an upper ring element and a lower ring element, wherein the sealing member is sandwiched in between the upper ring element and the lower ring element.

4. The thermoregulator as set forth in claim 1, wherein the outer valve body comprises an upper ring element and a lower ring element, wherein a sealing member is sandwiched in between the upper ring element and the lower ring element and the sealing member is configured to engage with the inner valve body to provide a seal of the first flow passage.

5. A thermoregulator, comprising:
a shell having an inner cavity therein;
inner and outer valve bodies disposed in the shell and separates the inner cavity of the shell into a first cavity and a second cavity;
a heat-sensitive element disposed in the shell and adapted to control the inner and outer valve bodies according to temperature;
an elastic member coupled to the inner valve body,
wherein the elastic member normally pushes the inner valve body in a first direction from the first cavity toward the second cavity to prevent fluid communication between the first cavity and the second cavity,
wherein when a temperature of a fluid in the second cavity is higher than a first predetermined temperature and lower than a second predetermined temperature, the heat-sensitive element expands to move the inner valve body in a second direction opposed to the first direction to provide a first flow passage between the first cavity and the second cavity; and
wherein when the temperature of the fluid in the second cavity is equal to or higher than the second predetermined temperature, the heat-sensitive element expands to move the outer valve body through the inner valve body in the second direction to provide a second flow passage.

6. An apparatus for regulating temperature, comprising:
a shell comprising a first cavity and a second cavity; and
an inner valve body and an outer valve body disposed in the shell between the first cavity and the second cavity, wherein the inner valve body is movable relative to the outer valve body, and the outer valve body is movable within the shell, and
wherein:
the inner valve body and the outer valve body are configured to substantially seal the first cavity from the second cavity when a temperature inside the shell is lower than or equal to a first predetermined temperature,
the inner valve body is configured to provide a first flow path between the first cavity and the second cavity when the temperature inside the shell exceeds the first predetermined temperature but is lower than or equal to a second predetermined temperature, and
the outer valve body is configured provide a second flow path between the first cavity and the second cavity when the temperature inside the shell exceeds the second predetermined temperature.

7. The apparatus according to claim 6, further comprising a sealing member mounted on the outer valve body and having an inner ring surface, wherein the inner valve comprises a first inclined surface adapted to contact with the inner ring surface of the sealing member to substantially seal the first cavity from the second cavity.

8. The apparatus according to claim 7, wherein the sealing member further comprises an outer ring surface; wherein the first and the second cavities join at a junction adapted to contact with the outer ring surface of the sealing member to substantially seal the first cavity from the second cavity.

9. The apparatus according to claim 6, wherein the outer valve body further comprises a blocking structure configured to engage the inner valve body when the temperature inside the shell exceeds the second predetermined temperature.

10. The apparatus according to claim 9, wherein the blocking structure comprises a suspension part extended over at least part of the inner valve body.

11. The apparatus according to claim 6, wherein the outer valve body comprises a guiding structure, and wherein the inner valve body comprises a first guide part and a second guide part, the first guide part and the second guide part configured to engage with the guiding structure as the inner valve body moves relative to the outer valve body.

12. The apparatus according to claim 11, wherein the inner valve body further comprises a substrate plate with two opposing surfaces; wherein the first guide part and the second guide part are disposed respectively on each of the opposing surfaces of substrate plate.

13. The apparatus according to claim 12, wherein the guiding structure of the outer valve body comprises a plurality of project parts with a guide gap formed between two adjacent project parts; wherein the guide gap is configured to engage the first guide part of the inner valve body.

14. The apparatus according to claim 12, wherein the guiding structure of the outer valve body comprises a first guiding hole configured to engage the second guide part of the inner valve body.

15. The apparatus according to claim 6, wherein the inner valve body comprises a guide column, and wherein the shell further comprises a second guiding hole configured to engage the guide column of the inner valve body.

16. The apparatus according to claim 6, further comprising a heat-sensitive element disposed in the shell and coupled to the inner valve body to move the inner valve body according to temperature.

17. The apparatus according to claim 16, further comprising an elastic member disposed in the shell and coupled with the inner valve body, wherein the elastic member is configured to resist the movement of the inner valve body caused by the heat-sensitive element.

18. The apparatus according to claim 17, wherein the elastic member is a compression spring.

19. The apparatus according to claim 16, wherein the heat-sensitive element is configured to move the inner valve body by thermal expansion or contraction.

20. The apparatus according to claim 19, wherein the heat-sensitive element is coupled with the inner valve body with a pushrod.

* * * * *